(12) United States Patent
Iwasaki

(10) Patent No.: US 11,084,416 B2
(45) Date of Patent: Aug. 10, 2021

(54) VEHICLE LAMP SYSTEM

(71) Applicant: KOITO MANUFACTURING CO., LTD., Tokyo (JP)

(72) Inventor: Jun Iwasaki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/757,123

(22) PCT Filed: Oct. 18, 2018

(86) PCT No.: PCT/JP2018/038784
§ 371 (c)(1),
(2) Date: Apr. 17, 2020

(87) PCT Pub. No.: WO2019/078289
PCT Pub. Date: Apr. 25, 2019

(65) Prior Publication Data
US 2020/0269745 A1     Aug. 27, 2020

(30) Foreign Application Priority Data

Oct. 19, 2017    (JP) .............................. JP2017-202461

(51) Int. Cl.
*B60Q 1/08*        (2006.01)
*B60Q 1/34*        (2006.01)
*B60Q 1/50*        (2006.01)

(52) U.S. Cl.
CPC ............... *B60Q 1/08* (2013.01); *B60Q 1/34* (2013.01); *B60Q 1/50* (2013.01)

(58) Field of Classification Search
None
See application file for complete search history.

(56) References Cited

U.S. PATENT DOCUMENTS

2017/0240098 A1    8/2017    Sweeney et al.
2018/0004020 A1    1/2018    Kunii et al.
(Continued)

FOREIGN PATENT DOCUMENTS

JP       S61-193943 A     8/1986
JP       H09-277887 A    10/1997
(Continued)

OTHER PUBLICATIONS

International Search Report issued in International Application No. PCT/JP2018/038784, dated Dec. 25, 2018 (6 pages).
(Continued)

*Primary Examiner* — Britt D Hanley
(74) *Attorney, Agent, or Firm* — Osha Bergman Watanabe & Burton LLP

(57) ABSTRACT

This vehicle lamp system, which is used together with a vehicle control unit that controls the travel state of a vehicle, comprises an ID lamp which is mounted on the vehicle and which lights up when the vehicle control unit controls the travel state of the vehicle, and a lamp control unit which controls the ID lamp. The vehicle control unit is configured to output to the lamp control unit an advance warning signal that indicates a travel state change prior to making said change, and the lamp control unit is configured to control the ID lamp to switch between a first mode carried out when the vehicle control unit maintains a prescribed travel state without changing the travel state, and a second mode carried out when an advance warning signal has been inputted from the vehicle control unit.

5 Claims, 12 Drawing Sheets

(56) References Cited

U.S. PATENT DOCUMENTS

| | | | |
|---|---|---|---|
| 2018/0312106 A1 | 11/2018 | Tatara et al. | |
| 2018/0319325 A1 | 11/2018 | Tatara et al. | |
| 2019/0023281 A1 | 1/2019 | Fukutaka et al. | |

FOREIGN PATENT DOCUMENTS

| | | | | |
|---|---|---|---|---|
| JP | 2017-058761 A | 3/2017 | | |
| WO | 2014-009130 A1 | 1/2014 | | |
| WO | 2016-114048 A1 | 7/2016 | | |
| WO | WO-2016114048 A1 * | 7/2016 | ............. | G03B 17/54 |
| WO | 2017-073633 A1 | 5/2017 | | |
| WO | 2017-073634 A1 | 5/2017 | | |
| WO | WO-2017073633 A1 * | 5/2017 | ............... | B60Q 1/26 |
| WO | WO-2017073634 A1 * | 5/2017 | ............. | G08G 1/162 |
| WO | 2017-138151 A1 | 8/2017 | | |

OTHER PUBLICATIONS

Written Opinion issued in International Application No. PCT/JP2018/038784, dated Dec. 25, 2018 (4 pages).
Extended European Search Report issued in European Application No. 18868443.5, dated Jun. 14, 2021 (8 pages).

* cited by examiner

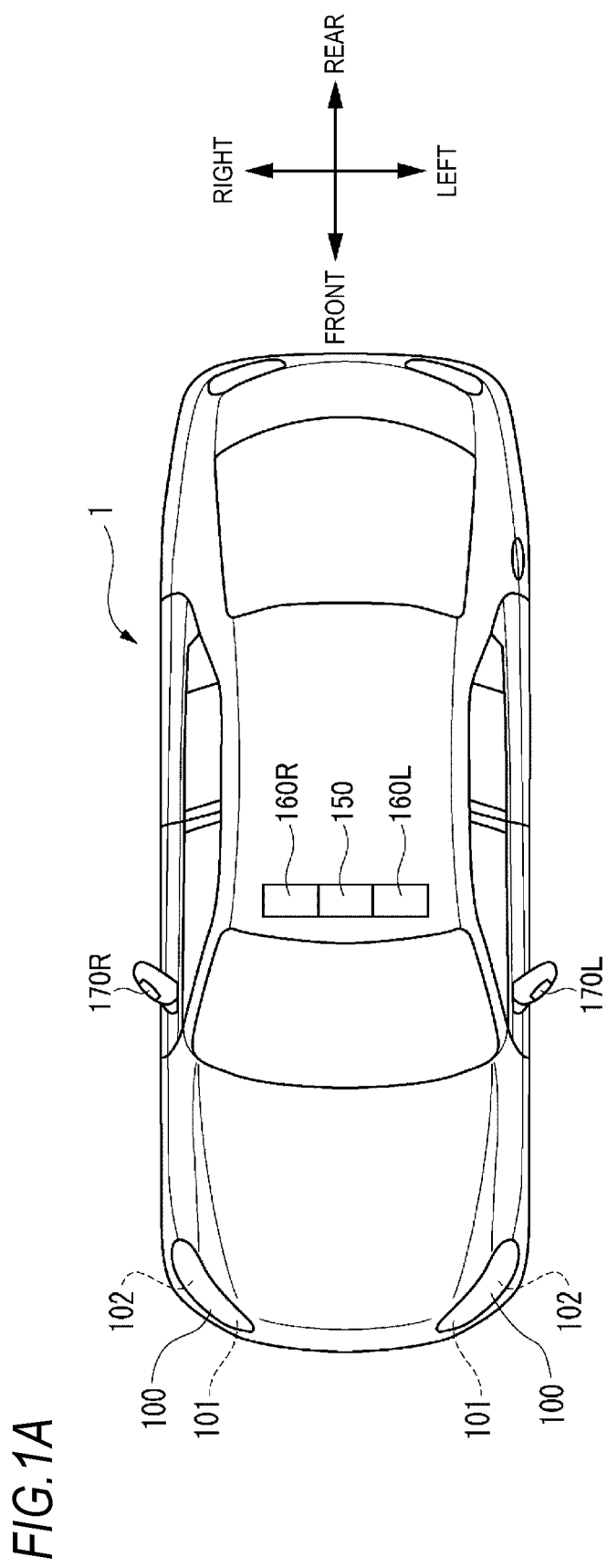

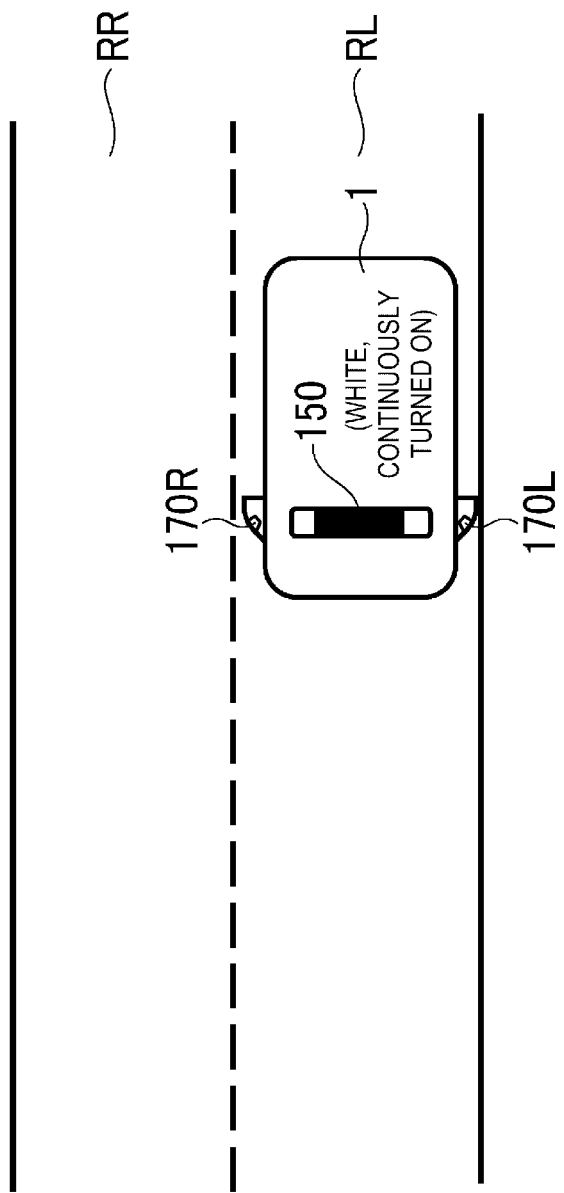

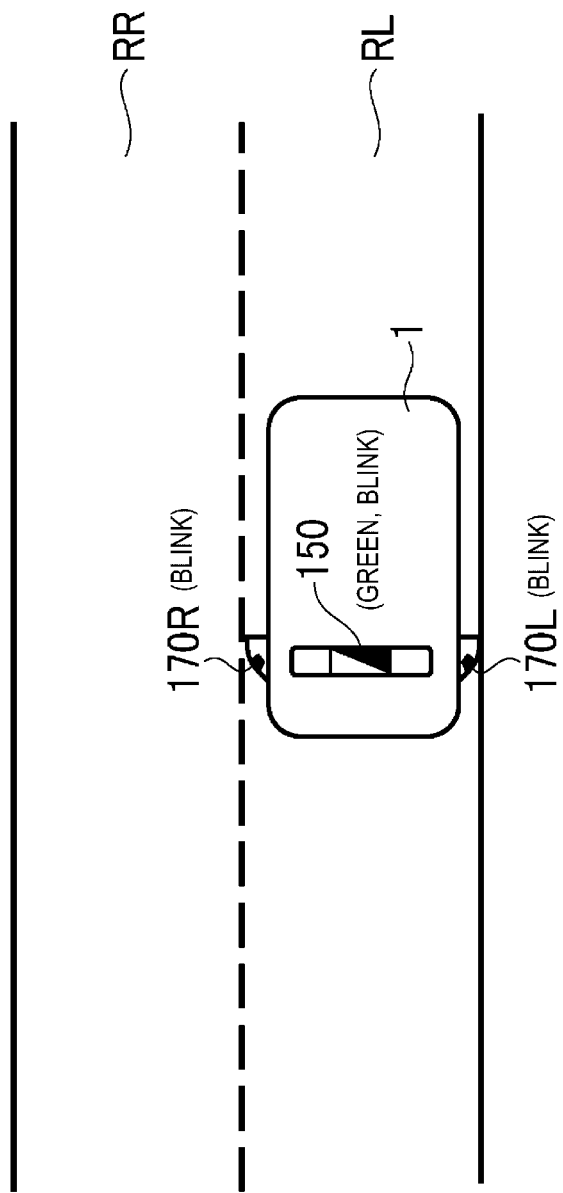

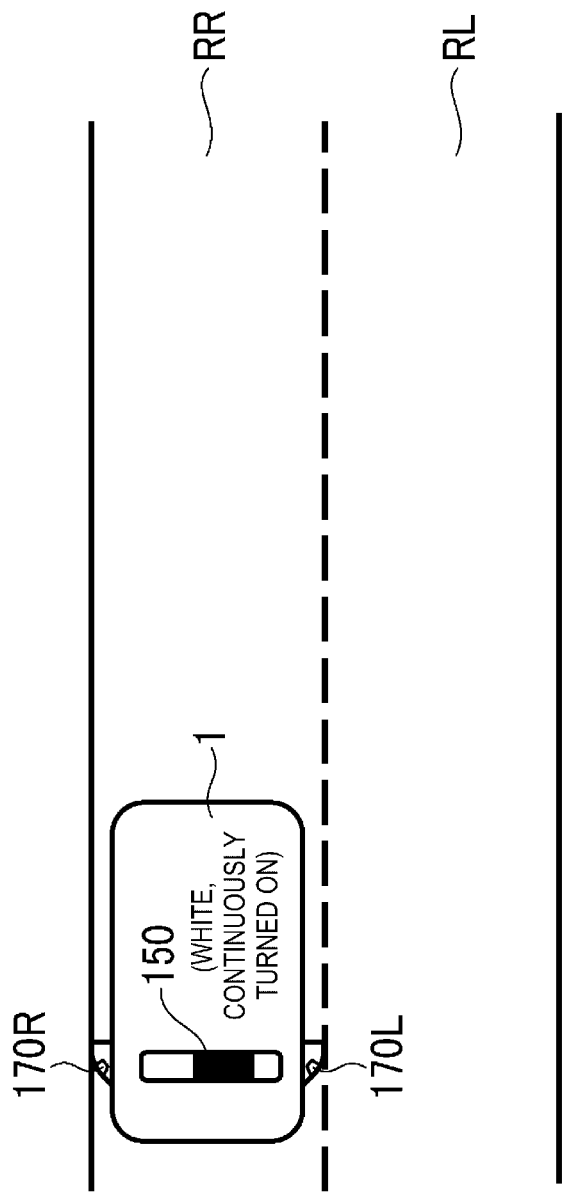

VEHICLE LAMP SYSTEM

TECHNICAL FIELD

The present invention relates to a vehicle lamp system.

BACKGROUND ART

Currently, research on automatic driving technology of an automobile has been actively performed in each country, and legislation for enabling a vehicle to travel on a public road in an automatic driving mode has been studied in each country. Here, the automatic driving mode refers to a mode in which the traveling of the vehicle is automatically controlled. On the other hand, a manual driving mode refers to a mode in which the traveling of the vehicle is controlled by a driver. In an automatic driving vehicle, the traveling of the vehicle is automatically controlled by a computer.

CITATION LIST

Patent Literature

Patent Literature 1: JP-A-H9-277887

SUMMARY OF INVENTION

Technical Problem

For example, when the vehicle is shifted from a stopped state to a traveling state, and when the vehicle intends to change a lane, if traveling or a lane change is intended to be suddenly executed, a sense of discomfort might be given to another vehicle or pedestrian.

Therefore, an object of the present invention is to provide a vehicle lamp system that can notify a third party of operation before the operation is actually executed.

Solution to Problem

In order to solve the above problem, a vehicle lamp system of the present invention is configured to be used together with a vehicle control unit configured to control a traveling state of a vehicle. The vehicle lamp system comprises:

an automatic driving lamp mounted on the vehicle, the automatic driving lamp being turned on when the vehicle control unit controls the traveling state of the vehicle; and a lamp control unit configured to control the automatic driving lamp, wherein the vehicle control unit is configured to output an advance notice signal which notifies a change in advance to the lamp control unit before a traveling state is changed, and the lamp control unit is configured to control the automatic driving lamp by switching a mode between a first mode and a second mode, the first mode being executed when the vehicle control unit maintains a predetermined traveling state without changing the traveling state, the second mode being executed when the advance notice signal is received from the vehicle control unit.

According to the above configuration, since it is possible to give notice in advance before the traveling state is actually changed, it is unlikely to give another vehicle or pedestrian a sense of discomfort. Further, since the automatic driving lamp can be made to function as a lamp for giving notice in advance, the number of components of the vehicle is not increased.

Advantageous Effects of Invention

According to the vehicle lamp system in the present invention, a third party can be notified of operation before the operation is actually executed.

BRIEF DESCRIPTION OF DRAWINGS

FIG. 1A is a top view of a vehicle including a vehicle lamp system according to an embodiment of the present invention.

FIG. 7A is a diagram showing a change in a display aspect of an ID lamp.

FIG. 7B is a diagram showing a change in the display aspect of the ID lamp.

FIG. 7C is a diagram showing a change in the display aspect of the ID lamp.

DESCRIPTION OF EMBODIMENTS

Figure 1B:
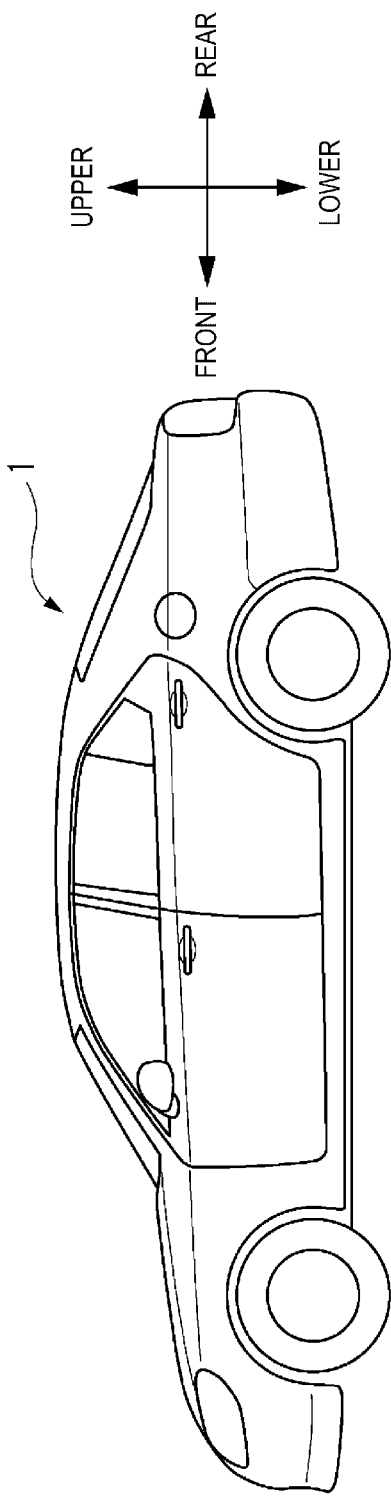
FIG. 1B is a side view of the vehicle including the vehicle lamp system according to the embodiment of the present invention.

Hereinafter, an embodiment of the present invention (hereinafter, referred to as a present embodiment) will be described with reference to the drawings. Descriptions of members having the same reference numerals as members that are already described in the description of the present embodiment will be omitted for convenience of description.

In the description of the present embodiment, a "left-right direction", a "front-rear direction", and an "upper-lower direction" will be referred to as appropriate for convenience of description. These directions are relative directions set for a vehicle 1 shown in FIGS. 1A and 1B. Here, the "upper-lower direction" is a direction including an "upper direction" and a "lower direction". The "front-rear direction" is a direction including a "front direction" and a "rear direction". The "left-right direction" is a direction including a "left direction" and a "right direction".

FIGS. 1A and 1B show the vehicle 1 on which a vehicle lamp system according to the present embodiment is mounted. FIG. 1A shows a top view of the vehicle 1. FIG. 1B shows a side view of the vehicle 1. The vehicle 1 is an automobile that is travelable in an automatic driving mode.

The vehicle 1 has an identification lamp (hereinafter, referred to as an ID lamp) 150 (an example of an automatic driving lamp), a right signaling lamp 160R, and a left signaling lamp 160L mounted on a roof. Further, a right turn signal lamp 170R and a left turn signal lamp 170L are mounted on the vehicle 1.

The ID lamp 150 is a lamp indicating that the vehicle 1 is in the automatic driving mode. In the present embodiment, the ID lamp 150 is provided at a center portion of the vehicle 1 in the left-right direction. The ID lamp 150 is turned on when a vehicle control unit 3 is controlling a traveling state of the vehicle 1. In the present embodiment, the vehicle control unit 3 turns on a lamp during execution of a fully automatic driving mode and an advanced driving support mode to be described below.

The signaling lamps 160R and 160L are lamps that transmit an intention (will) of the vehicle 1 in the automatic driving mode to a third party on a road such as another vehicle or a pedestrian. The right signaling lamp 160R is disposed on a right side of the ID lamp 150. The left signaling lamp 160L is disposed on a left side of the ID lamp 150. The right signaling lamp 160R and the left signaling lamp 160L are symmetrically attached with respect to a centerline that extends in the front-rear direction of the vehicle 1.

Lamp units 100 are mounted in right and left front portions of the vehicle 1. In the lamp unit 100, a headlamp (HL) 101 and a road surface drawing lamp 102 are built. Further, the vehicle 1 has the turn signal lamps 170R and 170L mounted on door mirrors.

Figure 2:
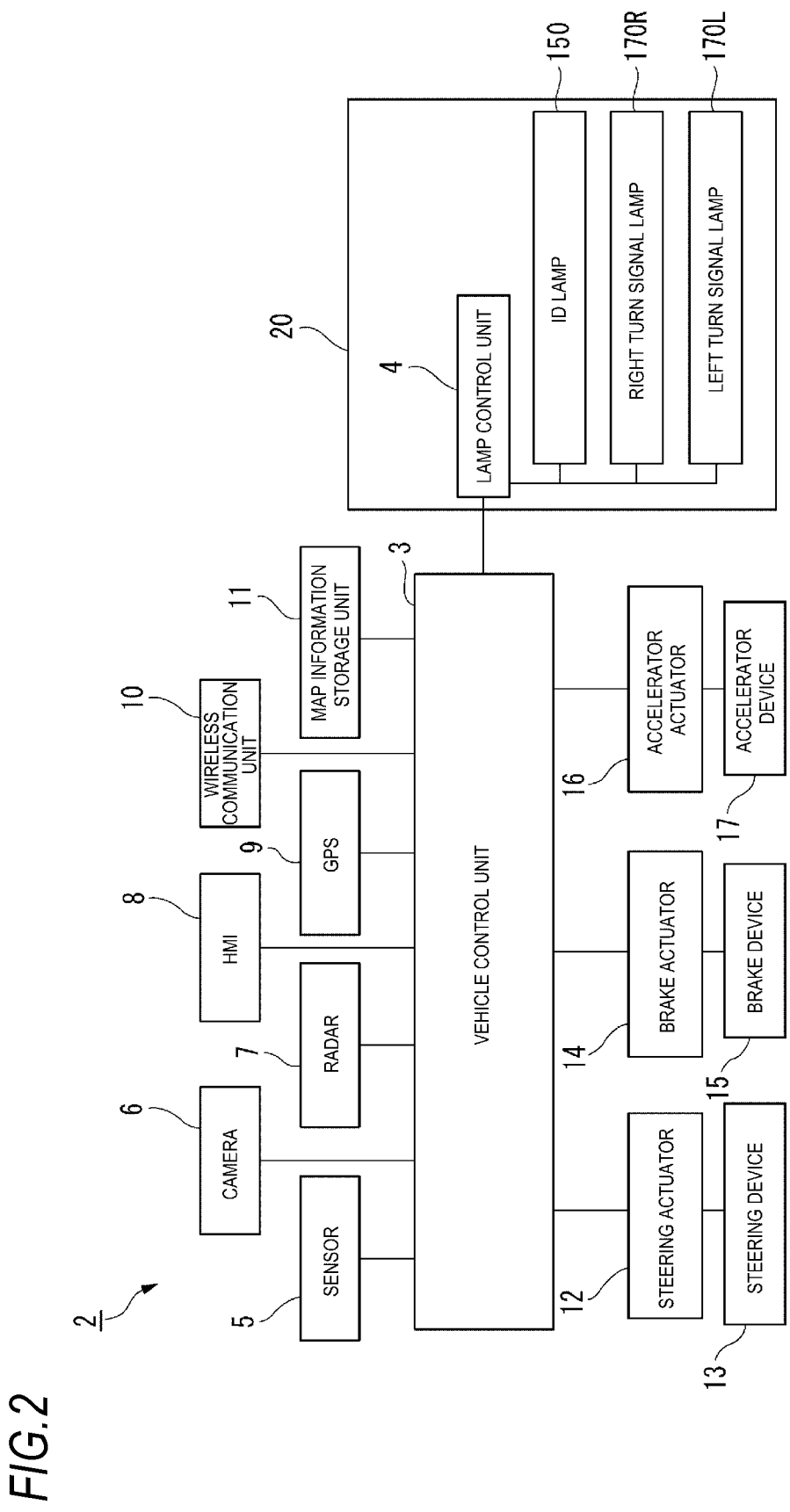
FIG. 2 is a block diagram of a vehicle system and the vehicle lamp system.

FIG. 2 shows a block diagram of a vehicle system 2 and a vehicle lamp system 20 that are mounted on the vehicle 1. First, the vehicle system 2 will be described with reference to FIG. 2. As shown in FIG. 2, the vehicle system 2 includes the vehicle control unit 3, a sensor 5, a camera 6, a radar 7, a human machine interface (HMI) 8, a global positioning system (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 includes an electronic control unit (ECU). The electronic control unit includes (i) a processor such as a central processing unit (CPU), (ii) a read only memory (ROM) in which various vehicle control programs are stored, and (iii) a random access memory (RAM) in which various pieces of vehicle control data is temporarily stored. The processor loads a program designated from the various vehicle control programs stored in the ROM on the RAM, and executes various processings in cooperation with the RAM. The vehicle control unit 3 controls the traveling of the vehicle 1 based on external information of the vehicle 1.

The sensor 5 includes an acceleration sensor, a speed sensor, a gyro sensor, and the like. The sensor 5 detects a traveling state of the vehicle 1 and outputs traveling state information to the vehicle control unit 3. The sensor 5 may further include a seating sensor that detects whether a driver is sitting on a driving seat, a face direction sensor that detects a direction of a face of the driver, an outside weather sensor that detects an outside weather state, a human sensor that detects whether a person exists in the vehicle, and the like. Further, the sensor 5 may include an illuminance sensor that detects illuminance of a surrounding environment of the vehicle 1.

The camera 6 is a camera including, for example, an imaging element such as a charge-coupled device (CCD) or a complementary MOS (CMOS). The camera 6 is a camera that detects visible light or an infrared camera that detects infrared rays. The radar 7 is a millimeter-wave radar, a microwave radar, a laser radar, or the like. The camera 6 and the radar 7 detect the surrounding environment of the vehicle 1 (another vehicle, a pedestrian, a road shape, a traffic sign, an obstacle, and the like) and output surrounding environment information to the vehicle control unit 3.

The HMI 8 includes an input unit that receives an input operation from the driver and an output unit that outputs traveling information and the like to the driver. The input unit includes a steering wheel, an accelerator pedal, a brake pedal, a driving mode switching switch configured to switch a driving mode of the vehicle 1, and the like. The output unit is a display configured to display various pieces of traveling information.

The GPS 9 is configured to acquire current position information of the vehicle 1 and output the acquired current position information to the vehicle control unit 3. The wireless communication unit 10 is configured to receive traveling information of another vehicle around the vehicle 1 from another vehicle, and transmit the traveling information of the vehicle 1 to another vehicle (vehicle-to-vehicle communication). Further, the wireless communication unit 10 is configured to receive infrastructure information from infrastructure equipment such as a traffic light or a marker lamp, and transmit the traveling information of the vehicle 1 to the infrastructure equipment (road-to-vehicle communication). The map information storage unit 11 is an external storage device such as a hard disk drive in which map information is stored. The map information storage unit 11 is configured to output the map information to the vehicle control unit 3.

The driving mode of the vehicle 1 includes the fully automatic driving mode, the advanced driving support mode, a driving support mode, and a fully manual driving mode. When the vehicle 1 travels in the fully automatic driving mode or the advanced driving support mode, the vehicle control unit 3 automatically generates at least one of a steering control signal, an accelerator control signal, and a brake control signal based on external information such as the traveling state information, the surrounding environment information, the current position information, and the map information. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, in these modes, the traveling of the vehicle 1 is automatically controlled by the vehicle system 2.

On the other hand, when the vehicle 1 travels in the driving support mode or the fully manual driving mode, the vehicle control unit 3 generates the steering control signal, the accelerator control signal, and the brake control signal in accordance with a manual operation of the driver on the accelerator pedal, the brake pedal, and the steering wheel. In this way, in these modes, since the steering control signal, the accelerator control signal, and the brake control signal are generated by the manual operation of the driver, the traveling of the vehicle 1 is controlled by the driver.

Next, the driving mode of the vehicle 1 will be described. In the fully automatic driving mode, the vehicle system 2 automatically executes all traveling control of steering control, brake control, and accelerator control, and the driver is not in a state where the vehicle 1 can be driven. In the advanced driving support mode, the vehicle system 2 automatically executes all the traveling control of the steering control, the brake control, and the accelerator control, and the driver does not drive the vehicle 1 although the driver is in a state where the vehicle 1 can be driven.

On the other hand, in the driving support mode, the vehicle system 2 automatically executes a part of the traveling control among the steering control, the brake control, and the accelerator control, and the driver drives the vehicle 1 with driving support of the vehicle system 2. In the fully manual driving mode, the vehicle system 2 does not automatically execute the traveling control, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among the four driving modes (the fully automatic driving mode, the advanced driving support mode, the driving support mode, and the fully manual driving mode) in accordance with an operation of the driver on the driving mode switching switch. Further, the driving mode of the vehicle 1 may be automatically switched based on information about a travelable section where an automatic driving vehicle can travel and about a traveling prohibited section where the driving of the automatic driving vehicle is prohibited, or based on information about outside weather state. In this case, the vehicle control unit 3 switches the driving mode of the vehicle 1 based on these pieces of external information. Further, the driving mode of the vehicle 1 may be automatically switched by using the seating sensor, the face direction sensor, and the like. In this case, the vehicle control unit 3 switches the driving mode of the vehicle 1 based on output signals from the seating sensor and the face direction sensor.

The vehicle control unit 3 determines, for example, an "automatic driving level" of another vehicle in the vicinity based on the external information acquired from the sensor 5, the camera 6, the GPS 9, the wireless communication unit 10, the map information storage unit 11, and the like. The automatic driving level in the present embodiment is classified into two categories: an "automatic driving mode" level and a "manual driving mode" level. The "automatic driving mode" level is a concept including the fully automatic driving mode and the advanced driving support mode. The "manual driving mode" level is a concept including the driving support mode and the fully manual driving mode. The automatic driving mode and the manual driving mode are distinguished by determining whether the driver has responsibility of driving the vehicle. In the fully automatic driving mode and the advanced driving support mode, the driver does not have the responsibility of driving, and the driver does not drive the vehicle. In the driving support mode and the fully manual driving mode, the driver has the responsibility of driving, the driver drives the vehicle, and the vehicle control unit 3 supports the driving performed by the driver.

Figure 3:
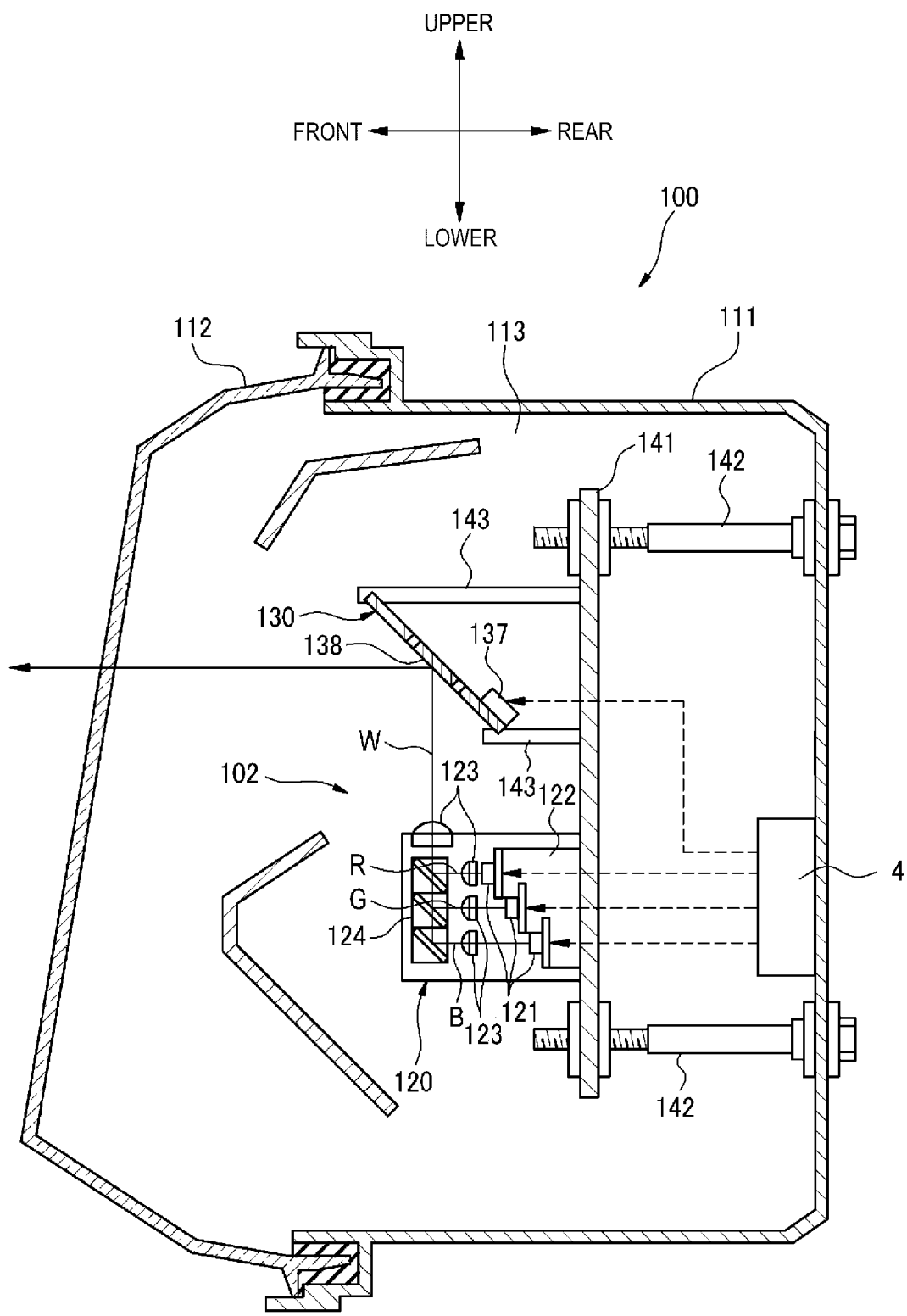
FIG. 3 is a vertical cross-sectional view of a road surface drawing lamp.

FIG. 3 is a vertical cross-sectional view showing a schematic configuration of the road surface drawing lamp 102 built in the lamp unit 100. As shown in FIG. 3, the lamp unit 100 includes a lamp body 111 including an opening portion on a vehicle front side, and a transparent front cover 112 attached to cover the opening portion of the lamp body 111. The road surface drawing lamp 102, a lamp control unit 4, and the like are housed in a lamp chamber 113 formed by the lamp body 111 and the front cover 112. Although not shown in the cross-sectional view of FIG. 3, similar to the road surface drawing lamp 102, the headlamp 101 is also housed in the lamp chamber 113.

The road surface drawing lamp 102 includes a light source unit 120 and a light distribution unit 130 that reflects light from the light source unit 120. The light source unit 120 and the light distribution unit 130 are supported at predetermined positions in the lamp chamber 113 by a support plate 141. The support plate 141 is attached to the lamp body 111 via aiming screws 142.

The light source unit 120 includes a plurality of (three in the present embodiment) light sources 121, a heat sink 122, a plurality of (four in the present embodiment) lenses 123, and a light collection unit 124. The light source unit 120 is fixed to a front surface of the support plate 141. The light sources 121 are electrically connected to the lamp control unit 4.

The light distribution unit 130 includes a terminal unit 137 and a reflection mirror 138. A positional relationship between the light distribution unit 130 and the light source unit 120 is determined such that laser light emitted from the light source unit 120 can be reflected toward a front side of the road surface drawing lamp 102 via the reflection mirror 138. The light distribution unit 130 is fixed to tip ends of protruding portions 143 that protrude to a front side from the front surface of the support plate 141. The terminal unit 137 is electrically connected to the lamp control unit 4.

The lamp control unit 4 is fixed to the lamp body 111 on a rear side of the support plate 141. A position where the lamp control unit 4 is provided is not limited to this position. The road surface drawing lamp 102 is configured such that an optical axis can be adjusted in a horizontal direction and a vertical direction by rotating the aiming screws 142 to adjust a posture of the support plate 141.

Figure 4:
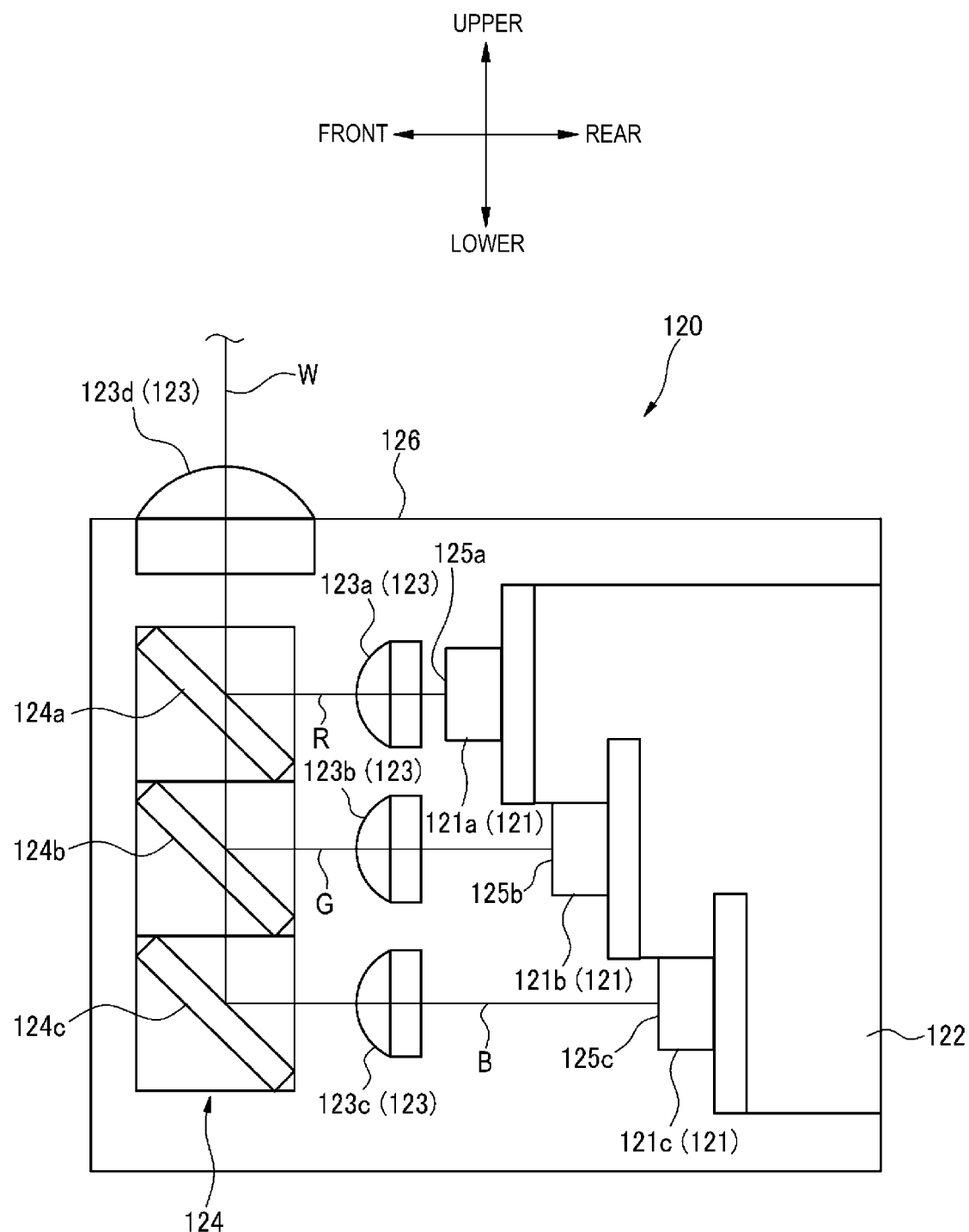
FIG. 4 is a side view showing a configuration of a light source unit of the road surface drawing lamp.

FIG. 4 is a side view of the light source unit 120 that constitutes the road surface drawing lamp 102. As shown in FIG. 4, the light source unit 120 includes a first light source 121a, a second light source 121b, a third light source 121c, the heat sink 122, a first lens 123a, a second lens 123b, a third lens 123c, a fourth lens 123d, and the light collection unit 124.

The first light source 121a is a light source that emits red laser light R. The first light source 121a includes a light-emitting element including a red laser diode. Similarly, the second light source 121b includes a green laser diode that emits green laser light G, and the third light source 121c includes a blue laser diode that emits blue laser light B. The first light source 121a, the second light source 121b, and the third light source 121c are arranged such that a laser light-emitting surface 125a, a laser light-emitting surface 125b, and a laser light-emitting surface 125c, which are respective light-emitting surfaces, are parallel to one another. The light-emitting element of each light source is not limited to the laser diode.

The first light source 121a to the third light source 121c are arranged such that the respective laser light-emitting surfaces 125a to 125c face the front side of the road surface drawing lamp 102, and are attached to the heat sink 122. The heat sink 122 is formed of a material having high thermal conductivity such as aluminum. The heat sink 122 is attached to the light source unit 120 in a state where a rear side surface of the heat sink 122 is in contact with the support plate 141 (see FIG. 3).

The first lens 123a to the fourth lens 123d include, for example, a collimating lens. The first lens 123a is provided on an optical path of the red laser light R between the first light source 121a and the light collection unit 124, converts the red laser light R emitted from the first light source 121a into parallel light, and emits the parallel light to the light collection unit 124. The second lens 123b is provided on an optical path of the green laser light G between the second light source 121b and the light collection unit 124, converts the green laser light G emitted from the second light source 121b into parallel light, and emits the parallel light to the light collection unit 124.

The third lens 123c is provided on an optical path of the blue laser light B between the third light source 121c and the light collection unit 124, converts the blue laser light B emitted from the third light source 121c into parallel light, and emits the parallel light to the light collection unit 124. The fourth lens 123d is fitted into an opening provided in an upper portion of a housing 126 of the light source unit 120. The fourth lens 123d is provided on an optical path of white laser light W (to be described below) between the light collection unit 124 and the light distribution unit 130 (see FIG. 3), converts the white laser light W emitted from the light collection unit 124 into parallel light, and emits the parallel light to the light distribution unit 130.

The light collection unit 124 collects the red laser light R, the green laser light G, and the blue laser light B to generate the white laser light W. The light collection unit 124 includes a first dichroic mirror 124a, a second dichroic mirror 124b, and a third dichroic mirror 124c.

The first dichroic mirror 124a is at least a mirror that reflects red light and transmits blue light and green light. The first dichroic mirror 124a is disposed to reflect the red laser light R, which passes through the first lens 123a, toward the fourth lens 123d. The second dichroic mirror 124b is at least a mirror that reflects the green light and transmits the blue light. The second dichroic mirror 124b is disposed to reflect the green laser light G, which passes through the second lens 123b, toward the fourth lens 123d. The third dichroic mirror 124c is at least a mirror that reflects the blue light. The third dichroic mirror 124c is disposed to reflect the blue laser light B, which passes through the third lens 123c, toward the fourth lens 123d.

A positional relationship among the first dichroic mirror 124a to the third dichroic mirror 124c is determined such that optical paths of the laser light reflected respectively by the first dichroic mirror 124a to the third dichroic mirror 124c are parallel to one another, and the laser light is collected and incident on the fourth lens 123d. In the present embodiment, the first dichroic mirror 124a to the third dichroic mirror 124c are arranged such that regions of the dichroic mirrors 124a to 124c irradiated with the laser light (reflection points of the laser light) are aligned in a straight line.

The blue laser light B emitted from the third light source 121c is reflected by the third dichroic mirror 124c and advances to a second dichroic mirror 124b side. The green laser light G emitted from the second light source 121b is reflected by the second dichroic mirror 124b toward a first dichroic mirror 124a side, and is superimposed on the blue laser light B transmitted through the second dichroic mirror 124b. The red laser light R emitted from the first light source 121a is reflected by the first dichroic mirror 124a toward a fourth lens 123d side, and is superimposed on collected light of the blue laser light B and the green laser light G that are transmitted through the first dichroic mirror 124a. As a result, the white laser light W is formed, and the white laser light W passes through the fourth lens 123d and advances to the light distribution unit 130.

Among the first light source 121a to the third light source 121c, the first light source 121a that emits the red laser light R is disposed at a position closest to the light collection unit 124, the third light source 121c that emits the blue laser light B is disposed at a position farthest from the light collection unit 124, and the second light source 121b that emits the green laser light G is disposed at an intermediate position.

That is, the first light source 121a to the third light source 121c are arranged at positions closer to the light collection unit 124 as a wavelength of emitted laser light becomes longer.

Figure 5:
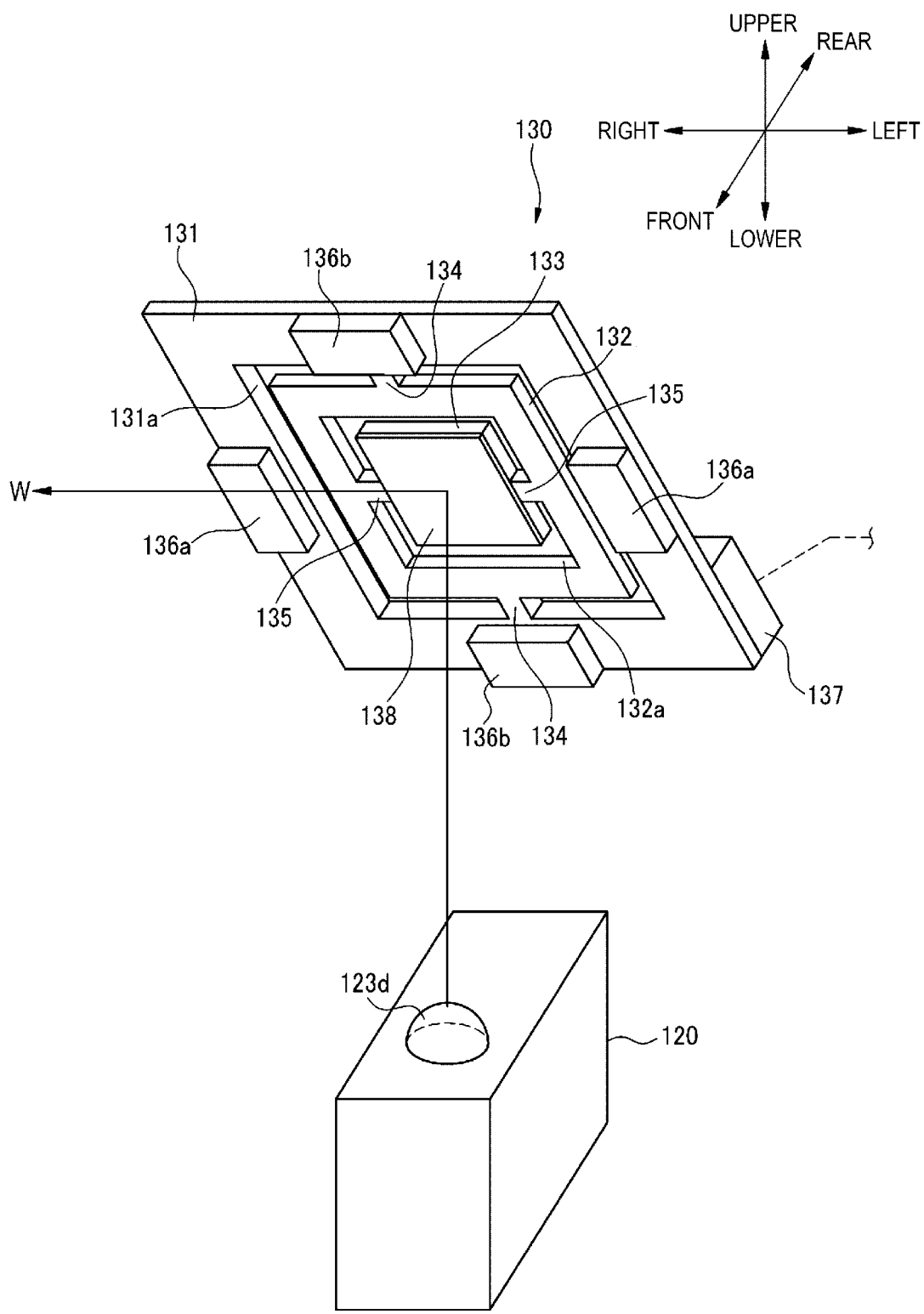
FIG. 5 is a perspective view showing a configuration of a light distribution unit of the road surface drawing lamp.

FIG. 5 is a perspective view when the light distribution unit 130 that constitutes the road surface drawing lamp 102 is observed from a front side. As shown in FIG. 5, the light distribution unit 130 includes a base 131, a first rotation body 132, a second rotation body 133, a first torsion bar 134, a second torsion bar 135, permanent magnets 136a and 136b, the terminal unit 137, and the reflection mirror 138. The light distribution unit 130 includes, for example, a galvanometer mirror. The light distribution unit 130 may include, for example, a MEMS mirror.

The base 131 is a frame body including an opening portion 131a at a center. The base 131 is fixed to the protruding portions 143 (see FIG. 3) in a state of being inclined in a front-rear direction of the road surface drawing lamp 102. The first rotation body 132 is disposed in the opening portion 131a of the base 131. The first rotation body 132 is a frame body including an opening portion 132a at a center. The first rotation body 132 is supported by the first torsion bar 134, which extends from a rear lower side to a front upper side of the road surface drawing lamp 102, to be rotatable left and right (vehicle width direction) with respect to the base 131.

The second rotation body 133 is disposed in the opening portion 132a of the first rotation body 132. The second rotation body 133 is a rectangular flat plate. The second rotation body 133 is supported by the second torsion bar 135, which extends in the vehicle width direction, to be rotatable upper and lower (in a vertical direction) with respect to the first rotation body 132. When the first rotation body 132 rotates left and right with the first torsion bar 134 serving as a rotation axis, the second rotation body 133 rotates left and right together with the first rotation body 132. The reflection mirror 138 is provided on a surface of the second rotation body 133 by plating, vapor deposition, or the like.

The base 131 is provided with a pair of permanent magnets 136a at a position orthogonal to an extending direction of the first torsion bar 134. The permanent magnets 136a form a magnetic field orthogonal to the first torsion bar 134. A first coil (not shown) is wired to the first rotation body 132. The first coil is connected to the lamp control unit 4 via the terminal unit 137. Further, the base 131 is provided with a pair of permanent magnets 136b at a position orthogonal to an extending direction of the second torsion bar 135. The permanent magnets 136b form a magnetic field orthogonal to the second torsion bar 135. A second coil (not shown) is wired to the second rotation body 133. The second coil is connected to the lamp control unit 4 via the terminal unit 137.

When a magnitude and a direction of a current that flows through the first coil and the second coil are controlled, the first rotation body 132 and the second rotation body 133 execute reciprocating rotation in a left-right direction, and the second rotation body 133 independently executes reciprocating rotation in an upper-lower direction. Accordingly, the reflection mirror 138 executes reciprocating rotation in upper-lower and left-right directions.

A positional relationship between the light source unit 120 and the light distribution unit 130 is determined such that the white laser light W emitted from the light source unit 120 is reflected by the reflection mirror 138 toward the front side of the road surface drawing lamp 102. The light distribution unit 130 scans a front side of the vehicle 1 with the white laser light W by the reciprocating rotation of the reflection mirror 138. For example, the light distribution unit 130 scans a region where a drawing pattern is to be formed with the white laser light W. Accordingly, the white laser light W is distributed to the region where the drawing pattern is formed, and a predetermined drawing pattern is formed at the front side of the vehicle 1 (for example, toward another vehicle in the vicinity).

Next, the vehicle lamp system 20 of the vehicle 1 will be described with reference to FIGS. 2 and 6, and FIGS. 7A to 7C.

As shown in FIG. 2, the vehicle lamp system 20 includes the lamp control unit 4, and the ID lamp 150, the right turn signal lamp 170R, and the left turn signal lamp 170L that are connected to the lamp control unit 4. The lamp control unit 4 is connected to the vehicle control unit 3. The vehicle lamp system 20 is used together with the vehicle control unit 3. The lamp control unit 4 is configured to control operations of the ID lamp 150 and the turn signal lamps 170R and 170L based on a signal transmitted from the vehicle control unit 3. In the following description, particularly when the right turn signal lamp 170R and the left turn signal lamp 170L are referred to without distinction, the right turn signal lamp 170R and the left turn signal lamp 170L may be collectively referred to as turn signal lamps 170.

The lamp control unit 4 in the present embodiment can control the ID lamp 150 in a first mode and a second mode different from the first mode. The first mode is a mode executed by the lamp control unit 4 when the vehicle control unit 3 maintains a predetermined traveling state without changing the traveling state. The second mode is a mode executed by the lamp control unit 4 when an advance notice signal is received from the vehicle control unit 3. Details of the first mode and the second mode will be described below.

Figure 6:
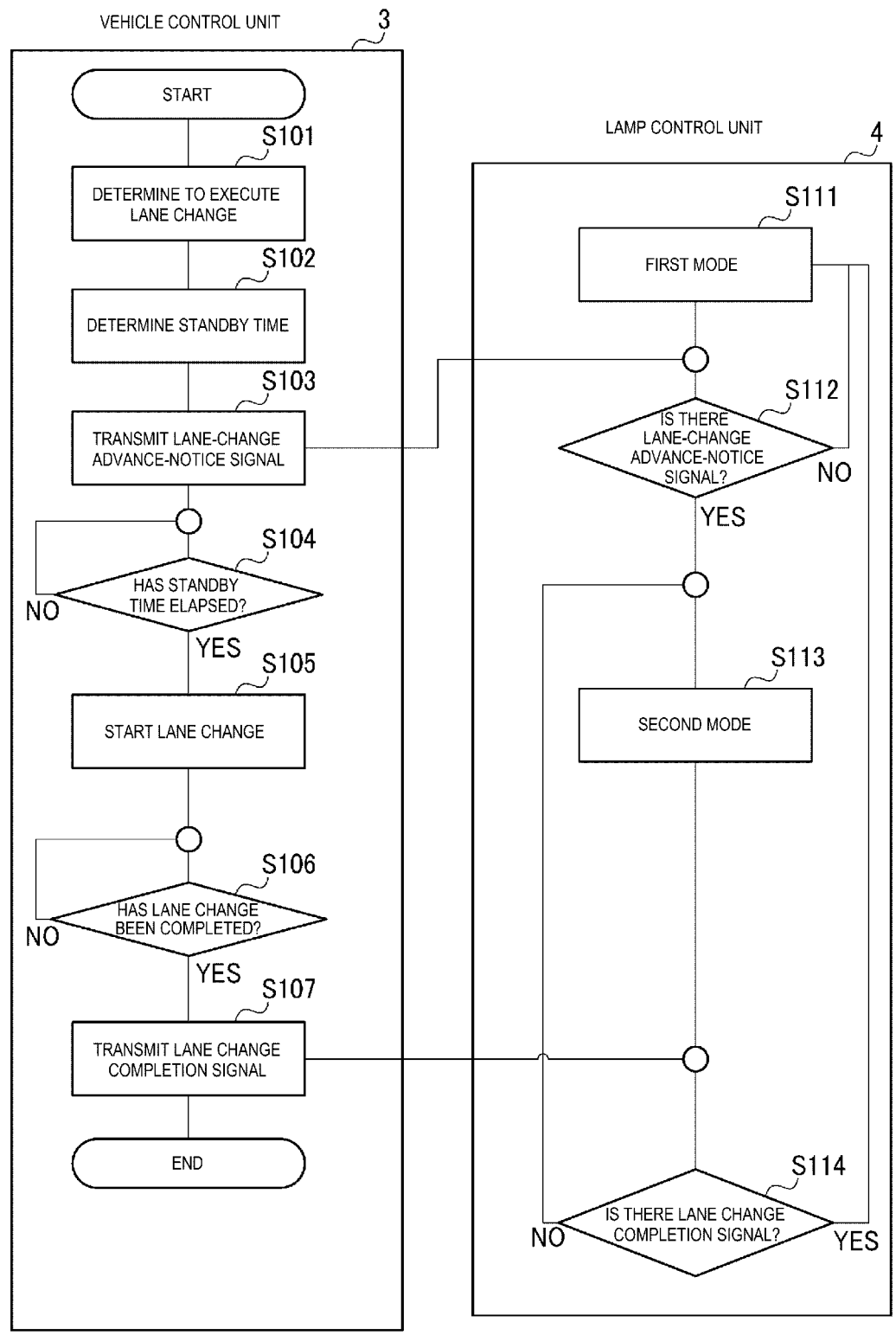
FIG. 6 is a flowchart executed by the vehicle lamp system.

Next, an operation example of the vehicle lamp system 20 will be described with reference to FIG. 6 and FIGS. 7A to 7C. FIG. 6 is a flowchart executed by the vehicle lamp system 20 when the vehicle 1 starts changing a traveling lane. Further, FIGS. 7A to 7C are diagrams showing an example of display until the vehicle 1 starts a lane change.

FIG. 7A shows a situation where the vehicle 1 set in the automatic driving mode is traveling on a left lane RL of a road R including two lanes. In FIG. 7A, the vehicle control unit 3 has not yet decided to execute the lane change. The vehicle control unit 3 maintains a current traveling state of the vehicle 1. In this state, the lamp control unit 4 controls the ID lamp 150 in the first mode (step S111).

The first mode is an aspect executed by the lamp control unit 4 when the vehicle control unit 3 maintains the predetermined traveling state without changing the traveling state. In the present embodiment, in the first mode, the lamp control unit 4 continuously turns on the ID lamp 150 in white.

FIG. 7B shows a case where the vehicle control unit 3 determines that it is necessary to change the lane to a right lane RR because, for example, the vehicle 1 turns right at an intersection ahead, or a left lane RL is merged into the right lane RR in the future. As shown in FIG. 6, the vehicle control unit 3 determines that it is necessary to, for example, turn right at the intersection ahead, and determines to execute the lane change (step S101).

The vehicle control unit 3, which has determined to execute the lane change, determines standby time starting from when the lane change is determined until the vehicle 1 actually starts the lane change (step S102). That is, the vehicle control unit 3 does not immediately cause the vehicle 1 to execute the lane change even when the lane change is determined to be executed, and continues a state where the left lane RF is traveled for a predetermined time.

The standby time can be determined in accordance with traffic conditions in the vicinity. For example, when another vehicle does not exist in the vicinity, the standby time can be set to 0.5 seconds. Alternatively, when another vehicle exists in a right-rear direction of the own vehicle, a relative speed between another vehicle and the own vehicle can be calculated, and time until another vehicle overtakes the own vehicle can be determined as the standby time. Alternatively, when another vehicle exists in the right-rear direction of the own vehicle and a speed of another vehicle is slower than that of the own vehicle, the standby time is set to three seconds, and time sufficient to convey an intention of the lane change by the own vehicle 1 is set.

After determining the lane change, the vehicle control unit 3 transmits a lane-change advance-notice signal to the lamp control unit 4 (step S103).

The vehicle control unit 3 changes the lane when the standby time has elapsed (step S104: Yes) and another vehicle does not exist on the change destination lane (step S105).

On the other hand, the lamp control unit 4 determines whether the lane-change advance-notice signal has been transmitted from the vehicle control unit 3 (step S112). When receiving the lane-change advance-notice signal (step S112: Yes), the lamp control unit 4 controls the ID lamp 150 in the second mode (step S113). The second mode is a mode in which lamps are controlled to notify in advance that a lane change is to be executed.

FIG. 7B shows the ID lamp 150 controlled in the second mode. The lamp control unit 4 executes the second mode and causes the ID lamp 150 to blink in green. When receiving the lane-change advance-notice signal, the lamp control unit 4 causes the right turn signal lamp 170R to blink together with the ID lamp 150.

Returning to FIG. 6. When the vehicle control unit 3 determines that the vehicle 1 has moved to the right lane RR and the lane change has been completed (step S106: Yes), a lane change completion signal is transmitted to the lamp control unit 4 (step S107). FIG. 7C shows a state where the lane change is completed.

When receiving the lane change completion signal from the vehicle control unit 3 (step S114: Yes), the lamp control unit 4 switches a mode from the second mode to the first mode. Accordingly, the lamp control unit 4 controls the ID lamp 150 in the first mode. The lamp control unit 4 continuously turns on the ID lamp 150 in white.

<Effects>

A vehicle that is traveling in the fully automatic driving mode may execute a lane change. However, when the vehicle, which is traveling straight ahead and is in the fully automatic driving mode, executes the lane change without any signal, another vehicle in the vicinity may feel a sense of discomfort with a sudden change in movement executed by the vehicle.

On the contrary, according to the vehicle lamp system 20 in the present embodiment, the lamps are controlled in the mode different from the normal mode before the lane change is started, and therefore executing the lane change from now can be notified in advance. Therefore, another vehicle or pedestrian in the vicinity can know in advance that a traveling state is to be changed by seeing a change in the lamps. Therefore, according to the vehicle lamp system 20, it is unlikely to give the sense of discomfort to another vehicle or pedestrian.

According to the vehicle lamp system in the present embodiment, the ID lamp 150 is continuously turned on such that the lamp, which is controlled when the change in the traveling state of the vehicle 1 is notified in advance, shows that the vehicle control unit 3 is executing the fully automatic driving mode or the advanced driving support mode during normal time when the traveling state of the vehicle 1 is not changed. Therefore, it is not necessary to separately provide (i) a dedicated lamp that notifies in advance a change in a traveling state and (ii) a dedicated lamp that shows that an automatic driving mode is being executed, and the number of components of the vehicle 1 is not increased.

In the present embodiment, the display of the ID lamp 150 controlled in the second mode in which the ID lamp 150 is caused to blink in green is returned to the first mode in which the ID lamp 150 is continuously turned on in white after the lane change is completed. Therefore, another vehicle can easily know that the vehicle 1 has completed the lane change, based on the change in the ID lamp 150.

In the embodiment described above, after determining the standby time, the vehicle control unit 3 may transmit the standby time to the lamp control unit 4. The lamp control unit 4 may control the lamp in the second mode in accordance with the standby time. For example, in the embodiment described above, a blinking cycle of the ID lamp 150 may be gradually shortened, so that the standby time is zero. That is, the ID lamp 150 may be continuously turned on when the lane change is executed.

In the embodiment described above, when the lamp control unit 4 is executing the second mode, the blinking of the ID lamp 150 may be executed in conjunction with blinking of one of the turn signal lamps 170. The ID lamp 150 is caused to blink in conjunction with the blinking of the turn signal lamp 170, whereby an appearance having a sense of unity can be implemented.

In the embodiment described above, although an example is shown in which the ID lamp 150 serving as the automatic driving lamp is provided on a roof of the vehicle 1 and the turn signal lamps 170R and 170L are provided in side mirrors of the vehicle, the present invention is not limited thereto. Positions where the ID lamp 150 and the turn signal lamps 170R and 170L are provided, shapes of the ID lamp 150 and the turn signal lamps 170R and 170L, and the like are not limited thereto.

Figure 8A:
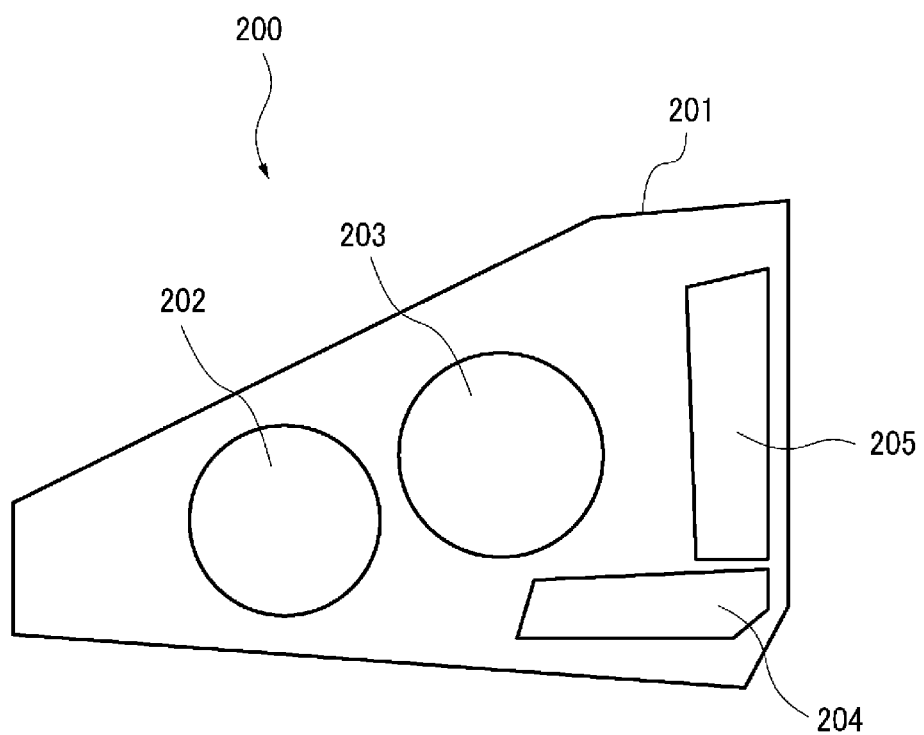
FIG. 8A is a diagram showing an example in which an ID lamp and a turn signal lamp are incorporated in a single headlamp unit.

As shown in FIG. 8A, an ID lamp and a turn signal lamp may be incorporated in a single headlamp unit 200. FIG. 8A is a front view of the headlamp unit 200. As shown in FIG. 8A, the headlamp unit 200 includes a common housing 201, a first headlamp 202, a second headlamp 203, an ID lamp 204, and a turn signal lamp 205. In the shown example, the ID lamp 204 includes a rectangular light-emitting unit whose long axis extends in a horizontal direction. The turn signal lamp 205 includes a rectangular light-emitting unit whose long axis extends in a vertical direction. The ID lamp 204 is provided below the turn signal lamp 205.

Figure 8B:
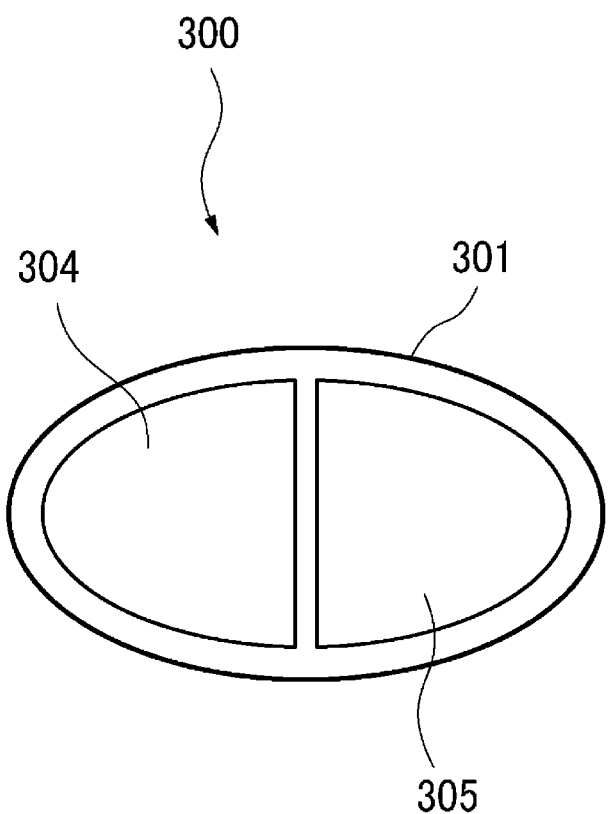
FIG. 8B is a diagram showing an example in which an ID lamp and a turn signal lamps are incorporated in a single turn signal lamp unit.

Alternatively, as shown in FIG. 8B, an ID lamp and a turn signal lamp may be incorporated in a single turn signal lamp unit 300. FIG. 8B is a front view of the turn signal lamp unit 300. As shown in FIG. 8B, the turn signal lamp unit 300 shows a common housing 301, an ID lamp 304, and a turn signal lamp 305. A size of a light-emitting unit of the ID lamp 304 and a size of a light-emitting unit of the turn signal lamp 305 are substantially the same. An elliptical light-emitting unit is divided into two parts by a short axis, one side is the ID lamp 304, and the other side is the turn signal lamp 305, so that a design having a sense of unity is made.

As shown in FIGS. 8A and 8B, the ID lamp and the turn signal lamp are provided in the common housing, whereby the number of components can be reduced.

Although the embodiment of the present invention has been described, it is needless to say that the technical scope of the present invention should not be interpreted as being limited to the description of the present embodiment. The embodiment is a mere example, and those skilled in the art will understand that the embodiment can be variously changed within the scope of the invention as described in the claims. The technical scope of the present invention should be determined based on the scope of the invention described in the claims and the scope of equivalents thereof.

In the embodiment described above, although an example has been described in which the lamp control unit 4 switches the ID lamp 150 from the first mode to the second mode during the lane change, the present invention is not limited thereto. During a right turn or a left turn, the lamp control unit 4 may switch the ID lamp 150 from the first mode to the second mode. Alternatively, the lamp control unit 4 may switch the ID lamp 150 from the first mode to the second mode when traveling is started from a stopped state. When the vehicle control unit 3 changes a traveling state of the vehicle, if the lamp control unit 4 switches the ID lamp 150 from the first mode to the second mode in order to notify the change in advance, another vehicle or a pedestrian around the own vehicle 1 can be notified of the change in advance.

The display aspect in the first mode and the display aspect in the second mode of the ID lamp 150 are not limited to those described above. The first mode and the second mode may be different from each other in at least one of a lighting color, a blinking cycle, an irradiation range, brightness, and a shape to be irradiated in.

In the above description, an example has been assumed in which the lamp control unit 4 is mounted on the lamp unit 100, and the vehicle lamp system 20 is configured as an independent system separate from the vehicle system 2. However, the present invention is not limited to this configuration. For example, the vehicle lamp system may be configured as a system including the vehicle control unit 3. Alternatively, the vehicle lamp system may be configured as a system including, for example, the camera, the sensor, the radar, and the like that are connected to the vehicle system 2. Further, the lamp control unit 4 may be configured as a part of the ECU that constitutes the vehicle control unit 3. In this case, the lamp control unit 4 is mounted on the vehicle 1 instead of the lamp unit 100.

In the present embodiment, although the driving mode of the vehicle has been described as including the fully automatic driving mode, the advanced driving support mode, the driving support mode, and the fully manual driving mode, the driving mode of the vehicle should not be limited to these four modes.

Classification and a display aspect of the driving mode of the vehicle may be appropriately changed in accordance with laws or rules on automatic driving in each country. Similarly, definitions of the "fully automatic driving mode", the "advanced driving support mode", and the "driving support mode" described in the description of the present embodiment are merely examples, and these definitions may be appropriately changed in accordance with laws or rules on the automatic driving in each country.

This application is based on Japanese Patent Application number 2017-202461, filed on Oct. 19, 2017, and the contents of which are incorporated herein by reference.

INDUSTRIAL APPLICABILITY

According to the present invention, there is provided the vehicle lamp system that can notify a third party of operation before the operation is actually executed.

REFERENCE SIGNS LIST

1 vehicle
2 vehicle system
3 vehicle control unit
4 lamp control unit
20 vehicle lamp system
150 ID lamp (an example of an automatic driving lamp)
170R, 170L turn signal lamp

The invention claimed is:

1. A vehicle lamp system configured to be used together with a vehicle control unit configured to control a traveling state of a vehicle, the vehicle lamp system comprising:
   an automatic driving lamp mounted on the vehicle, the automatic driving lamp being turned on when the vehicle control unit controls the traveling state of the vehicle; and
   a lamp control unit configured to control the automatic driving lamp,
   wherein the vehicle control unit is configured to output an advance notice signal which notifies a change an amount of time in advance to the lamp control unit before a traveling state is changed,
   wherein the amount of time is determined in accordance with a traffic condition in a vicinity of the vehicle, and
   wherein the lamp control unit is configured to control the automatic driving lamp by switching a mode between a first mode and a second mode, the first mode being executed when the vehicle control unit maintains a predetermined traveling state without changing the traveling state, the second mode being executed when the advance notice signal is received from the vehicle control unit.

2. The vehicle lamp system according to claim 1 further comprising a turn signal lamp, wherein the lamp control unit is configured to control the automatic driving lamp such that the automatic driving lamp is turned on in conjunction with turning on of the turn signal lamp as the second mode.

3. The vehicle lamp system according to claim 1, wherein the lamp control unit is configured to switch a mode from the second mode to the first mode after a traveling state notified in advance is changed after the advance notice signal is received.

4. The vehicle lamp system according to claim 1, wherein
   the vehicle control unit is configured to output a lane-change advance-notice signal to the lamp control unit as the advance notice signal before the vehicle changes a lane is changed, and
   the lamp control unit is configured to control the automatic driving lamp in the second mode until the lane is changed, when the lamp control unit receives the lane-change advance-notice signal from the vehicle control unit.

5. The vehicle lamp system according to claim 1, wherein the vehicle control unit is configured to output time until the traveling state is changed together with the advance notice signal to the lamp control unit.

* * * * *